United States Patent
Kamijima (12)

(10) Patent No.: US 6,289,578 B1
(45) Date of Patent: Sep. 18, 2001

(54) METHOD OF MANUFACTURING A THIN FILM MAGNETIC HEAD HAVING A WRITE ELEMENT WITH ALIGNED POLE TIPS

(75) Inventor: Akifumi Kamijima, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/421,328

(22) Filed: Oct. 18, 1999

Related U.S. Application Data

(62) Division of application No. 09/072,971, filed on May 6, 1998, now abandoned.

(30) Foreign Application Priority Data

May 29, 1997 (JP) .................................................... 9-139790

(51) Int. Cl.[7] ...................................................... G11B 5/42
(52) U.S. Cl. ................................... 29/603.14; 29/603.15; 29/603.25; 360/113; 360/126
(58) Field of Search ........................... 29/603.14, 603.15, 29/603.25; 360/113, 126

(56) References Cited

U.S. PATENT DOCUMENTS

| | | |
|---|---|---|
| 5,285,340 | 2/1994 | Ju et al. . |
| 5,438,747 | 8/1995 | Krounbi et al. . |
| 5,452,164 | 9/1995 | Cole et al. . |
| 5,721,078 | 2/1998 | Kamijima . |
| 5,725,997 | 3/1998 | Kamijima . |
| 5,747,198 | 5/1998 | Kamijima . |
| 5,932,396 | 8/1999 | Kamijima . |

FOREIGN PATENT DOCUMENTS

| | | |
|---|---|---|
| 6-28626 | 2/1994 | (JP) . |
| 7-225917 | 8/1995 | (JP) . |
| 7-262519 | 10/1995 | (JP) . |

*Primary Examiner*—Carl E. Hall
(74) *Attorney, Agent, or Firm*—Oblon, Spivak, McClelland, Maier & Neustadt, P.C.

(57) ABSTRACT

A thin film magnetic head in which the track width at the write pole can be set at a very small value with a high degree of accuracy without having to undergo a dry etching process. A first pole tip is laminated projecting out over a first yoke. a second pole tip is laminated onto a gap film, and has a track width which is equal to the track width of the first pole tip. The areas around the first pole tip, the second pole tip and the gap film are filled with a non-magnetic insulating film. The flattened surface of the non-magnetic insulating film forms a flat surface that is the same as the surface of the second pole tip, a second yoke, whose front end portion has a track width which is larger than the track width of the second pole tip, is laminated onto the second pole tip, with its two ends in the direction of the track width laminated onto the surface of the non-magnetic insulating film.

19 Claims, 10 Drawing Sheets

METHOD OF MANUFACTURING A THIN FILM MAGNETIC HEAD HAVING A WRITE ELEMENT WITH ALIGNED POLE TIPS

CROSS-REFERENCE TO RELATED APPLICATIONS

This application is a divisional application of Ser. No. 09/072,971 filed May 6, 1998, now abandoned and claims priority to Japanese Application No. JP 9-139790 filed May 29, 1997.

BACKGROUND OF THE INVENTION

1. Field of the Invention

The present invention relates to a thin film magnetic head and a method for manufacturing thereof.

2. Description of the Prior Art

The majority of thin film magnetic heads employed in a magnetic disk apparatus constituting storage systems for computers in recent years adopt a combined structure in which a thin film write element and a magnetoresistive (hereafter referred to as MR) read element are provided.

An MR read element is capable of achieving a high degree of resolution regardless of its speed relative to the magnetic disk. The MR read element includes a first shield film, a second shield film and an MR element. The first shield film and the second shield film are separated from each other by an appropriate non-magnetic insulator, with the MR element provided between the first shield film and the second shield film.

An inductive electromagnetic transducer is employed to function as a write element and is laminated onto the MR read element. The inductive thin film magnetic transducer constituting the write element is provided with a first magnetic film which also functions as the second shield film for the MR read element, a second yoke, a gap film and a coil film supported by an insulating film constituted of an organic resin and the like.

The front ends of the first magnetic film and the second yoke respectively constitute a first pole tip and a second pole tip that face opposite each other over the gap film having a very small thickness, and write is performed at the first pole tip and the second pole tip.

The yokes of the first magnetic film and the second magnetic film are linked to each other at the back gap portion located on the opposite side from the first pole tip and the second pole tip to complete a magnetic circuit. The coil film is formed to wind around the linking area of the yoke in a coil.

In order to achieve a high recording density by using this type of thin film magnetic head, the quantity of data stored per unit area of the magnetic disk (areal density) must be improved. The areal density is affected by the capability of the write element. The areal density can be improved by reducing the size of the gap between the poles at the write element. However, since reducing the size of the gap leads to a reduction in the magnetic flux intensity between the poles, there is naturally a limit to the extent to which the gap size can be reduced.

Another means for improving the areal density in recording is achieved by increasing the number of data tracks that can be recorded on the magnetic disk. Normally, the number of tracks that can be recorded on a magnetic disk is expressed as TPI (tracks per inch). The TPI capability of the write element can be improved by reducing the head dimensions, which determine the data track width. These head dimensions are normally referred to as the head track width.

One of the problems with the thin film magnetic head in the prior art described above is that, since the first magnetic film of the write element also functions as the second shield film for the MR read element, the track width at the first pole tip cannot be reduced, which results in a rather large side fringing magnetic field generated during recording. This magnetic field is caused by a leak of the magnetic flux from the second pole tip where the track width is reduced to the first magnetic film where the track width is not reduced. Such a side fringing magnetic field restricts the degree to which the track width can be reduced and consequently, limits the degree of improvement that can be achieved with respect to track density. In addition, it degrades the off-track performance when previously written track data are read by the MR element.

Japanese Unexamined Patent Publication No. 262519/1995 and Japanese Unexamined Patent Publication No. 225917/1995 disclose a means for matching the track width at the first pole tip to the track width at the second pole tip through ion beam milling. However, employing such means may cause problems such as particles resulting from the ion milling process becoming re-laminated onto the side wall of the second pole tip or the first pole tip. A portion that is formed as a result of such re-adhesion presents a hindrance to setting the track width at the write pole to a very small value with a high degree of precision. In addition, since the magnetic characteristics of the portion formed as a result of the re-adhesion will be degraded under normal circumstances, re-adhesion is not desirable in the sense that it works against achieving an improvement in the magnetic characteristics.

In addition, in this type of combined thin film magnetic head, the insulating film supporting the coil film is raised to a considerable degree. Because of this, when a photoresist is laminated during the photolithography process for forming the second yoke, the photoresist adheres over the great thickness at the portion with level differences. Consequently, the pattern at the second pole tip formed under the portion with level differences must be formed through the photoresist having a large film thickness, resulting in a markedly high aspect ratio (ratio of height to width of the resist). Thus, this is a negative factor in minimizing the track width.

In the prior art technology disclosed in Japanese Unexamined Patent Publication No. 28626/1994, after forming a first magnetic yoked layer (first yoke), a photoresist layer is laminated and an opening portion for forming, through patterning, a magnetic pole tip assembly constituted of a first pole tip, a gap film and a second pole tip is formed at the photoresist layer. Then, after the magnetic pole tip assembly is formed at the opening portion, the photoresist layer at the front of the magnetic pole tip assembly is removed. Next, the photoresist layer is hard-baked to form a flattened insulating layer. After this, a coil structure, an insulating film and the like are formed by adopting a method in the prior art and then a second magnetic yoked layer (second yoke) is formed. One of the problems with this prior art technology is that the photoresist layer, which cannot be readily flattened due to its fluidity and the like, must be used as a flattened film, and another problem is that the width of the second magnetic yoked layer (second yoke) in the direction of the tracks is smaller than that of the magnetic pole tip assembly.

Alternatively, in the prior art technology disclosed in the publication above, after a first magnetic yoked layer (first yoke) is formed, a photoresist layer is laminated, an opening portion for forming, through patterning, a magnetic pole tip assembly constituted of a first pole tip, a gap film and a second pole tip is formed at the photoresist layer, a coil structure, an insulating film and the like are formed after forming the magnetic pole tip assembly within the opening portion and then a second magnetic yoked layer (second yoke) is formed. A problem in this case is that since the second yoke must be laminated onto the magnetic pole tip assembly within the opening portion, the adhesion of the second yoke to the magnetic pole tip assembly tends to be problematic when the track width is reduced.

SUMMARY OF THE INVENTION

It is an object of the present invention to provide a thin film magnetic head in which the track width at the write pole can be set at a very small value with a high degree of accuracy without having to undergo a dry etching process.

It is a further object of the present invention to provide a thin film magnetic head having a structure that makes it possible to align the positions of the first pole tip and the second pole tip with small track widths easily and with a high degree of accuracy.

It is a still further object of the present invention to provide a manufacturing method that is suited for obtaining the thin film magnetic head described above.

In order to achieve the objects described above, in the thin film magnetic head according to the present invention, a write element includes a first magnetic film, a second magnetic film, a gap film and a coil film supported by an insulating film. The first magnetic film includes a first yoke and a first pole tip, with the first pole tip laminated onto the first yoke.

The second magnetic film includes a second pole tip and a second yoke. The second pole tip is laminated onto the gap film which is laminated onto the first pole tip, with the track width of the second pole tip set essentially equal to the track width of the first pole tip.

The areas around the first pole tip, the second pole tip and the gap film are filled with a non-magnetic insulating film. The surface of the non-magnetic insulating film is flattened, and the surface thus flattened forms a flat surface that is essentially the same as the surface of the second pole tip.

The second yoke is laminated onto the second pole tip with its front end portion having a larger track width than the track width of the second pole tip and its two ends in the direction of the track width laminated onto the surface of the non-magnetic insulating film. The insulating film supporting the coil film is formed on the surface of the non-magnetic insulating film.

The second pole tip at the write element faces opposite the first pole tip and is separated from the first pole tip by the gap film, with its track width set essentially equal to the track width of the first pole tip. Thus, high density recording can be achieved by preventing a side fringing magnetic field from being generated and by improving the track density.

Since the second yoke is laminated onto the second pole tip with its front end portion having a larger track width than the track width of the second pole tip, the write capability does not become degraded even if the track width at the second pole tip is reduced.

In addition, since a structure is adopted in which the second yoke is laminated onto the second pole tip instead of forming the second yoke and the second pole tip at the same time, the second yoke can be formed after forming the second pole tip in such a manner that it will have a track width equal to the track width of the first pole tip and the gap film. This structure achieves a number of advantages with respect to manufacturing processes. More specifically, a manufacturing process in which, after forming a frame on the second shield film (first yoke film), a laminated film a constituted of a magnetic film, a non-magnetic film and another magnetic film is formed to the inner and outer patterns defined by the frame, and then the laminated film formed onto the outer pattern is removed while leaving intact the laminated film formed to the inner pattern to achieve a laminated film comprising the second shield film constituting a first yoke, the magnetic film formed onto the second shield film to constitute a first pole tip, the non-magnetic film laminated onto the magnetic film to constitute a gap film and the other magnetic film laminated onto the non-magnetic film to constitute a second pole tip, can be adopted.

Since, by adopting this manufacturing method, the frame can be formed on a relatively flat surface during the laminating process, the track widths of the first pole tip and the second pole tip can be set at a very small value with a high degree of accuracy that is determined through photolithography.

Since the alignment of the first pole tip, the gap film and the second pole tip is executed through the same frame formed through the same photolithography process, the first pole tip and the second pole tip can be aligned with ease while achieving a high degree of accuracy.

The areas around the first pole tip, the second pole tip and the gap film are filled by the non-magnetic insulating film. The surface of the non-magnetic insulating film is flattened, and the surface thus flattened forms a flat surface that is essentially the same as the surface of the second pole tip. One of the advantages achieved through this structure is that the second yoke can be directly laminated onto the surface of the second pole tip without having to provide an indented portion or the like at the surface of the non-magnetic insulating film. Because of this, even when the track width of the second pole tip is reduced, the second yoke can be laminated onto the second pole tip with a high degree of reliability and great ease. Furthermore, since the front end portion of the second yoke has a track width larger than the track width of the second pole tip, the write capability does not deteriorate, even if the track width of the second pole tip is reduced. In addition, since the two ends of the second yoke in the direction of the track width are laminated onto the surface of the non-magnetic insulating film, a sufficient adhesion area and a sufficient degree of adhesion strength can be assured, even if the track width of the second pole tip is reduced.

Another advantage is that through the flattening of the non-magnetic insulating film, a flat base for forming the coil film is achieved. In other words, the coil film and its supporting insulating film can be formed on the flattened non-magnetic insulating film. As a result, since the coil film formation process can be executed on the flattened non-magnetic insulating film, disconnection, shorting and the like of the coil film, which tend to occur when forming the coil film in an area with level differences, can be avoided.

The formation and the flattening of the non-magnetic insulating film can be executed by removing the frame after forming the pole tips, forming the non-magnetic insulating film to cover the second shield film and the laminated film, flattening the surface of the non-magnetic insulating film thus formed and then exposing the surface of the second pole tip.

In the next process, the coil film and its supporting insulating film are formed on the flattened non-magnetic insulating film. Since the coil film formation process is executed on the flattened non-magnetic insulating film, disconnection, shortening and the like of the coil film, which tend to occur when forming the coil film in an area with level differences, can be avoided.

After forming the insulating film to support the coil film, the second yoke is formed. By the time the second yoke is formed, the first pole tip and the second pole tip, which determine the write characteristics, will have already been formed. Thus, the execution of the second yoke formation process does not affect the track width.

The thin film magnetic head according to the present invention normally includes an MR read element. The MR read element includes a first shield film, a second shield film and an MR element, with the first shield film and the second shield film provided over a distance from each other and the MR element provided between the first shield film and the second shield film.

The write element is laminated onto the MR read element. In this structure, the second shield film also functions as the first yoke of the write element. Since the first pole tip is provided projecting out over the first yoke, the track width of the first pole tip can be reduced while maintaining the width of the second shield film at a dimension that is required for the protection of the MR read element.

BRIEF DESCRIPTION OF THE DRAWINGS

More specific features and advantages of the present invention are explained in further detail in reference to the drawings, wherein.

DETAILED DESCRIPTION OF THE PREFERRED EMBODIMENTS

Figure 1:
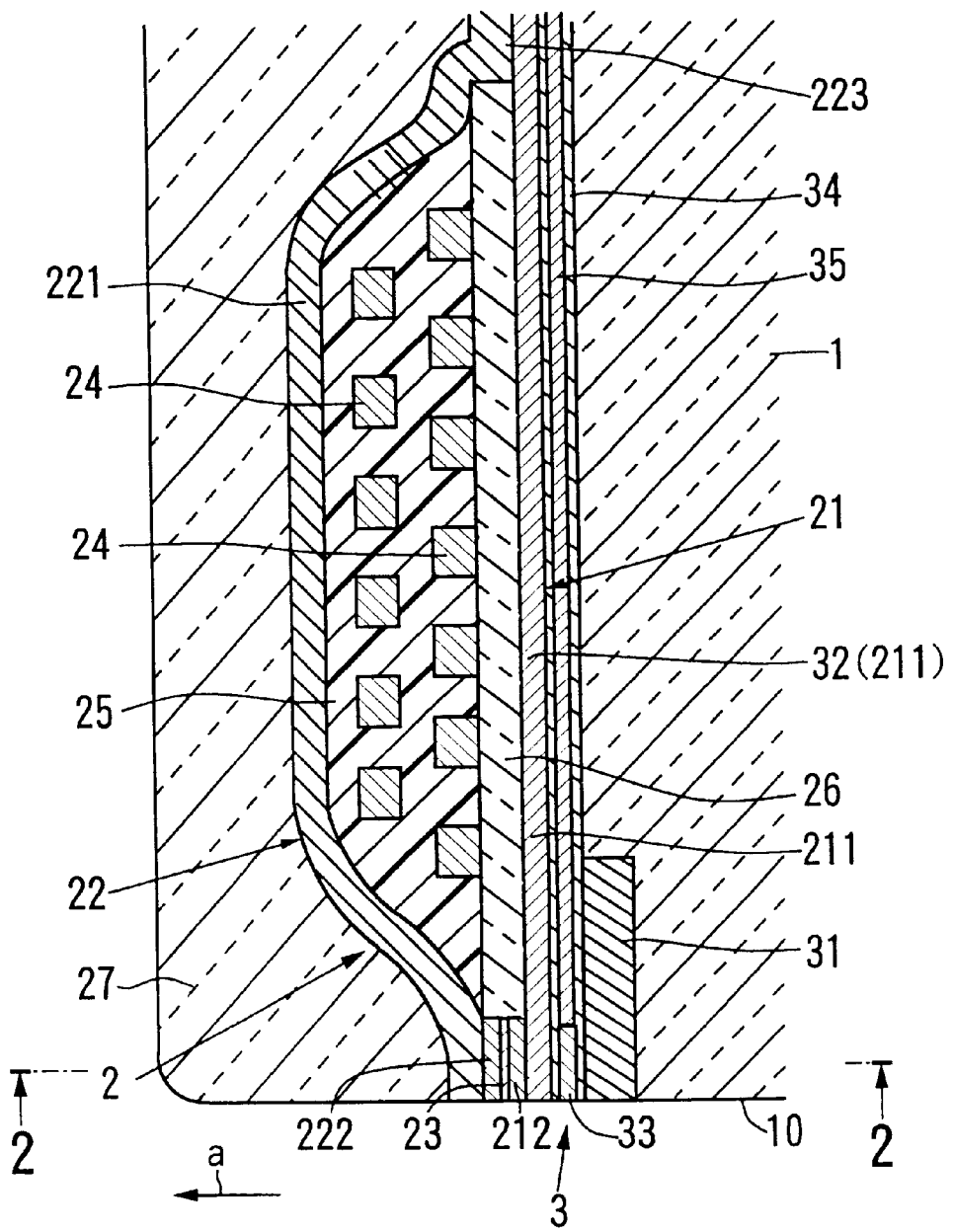
FIG. 1 is a cross section of the thin film magnetic head according to the present invention.
Figure 2:
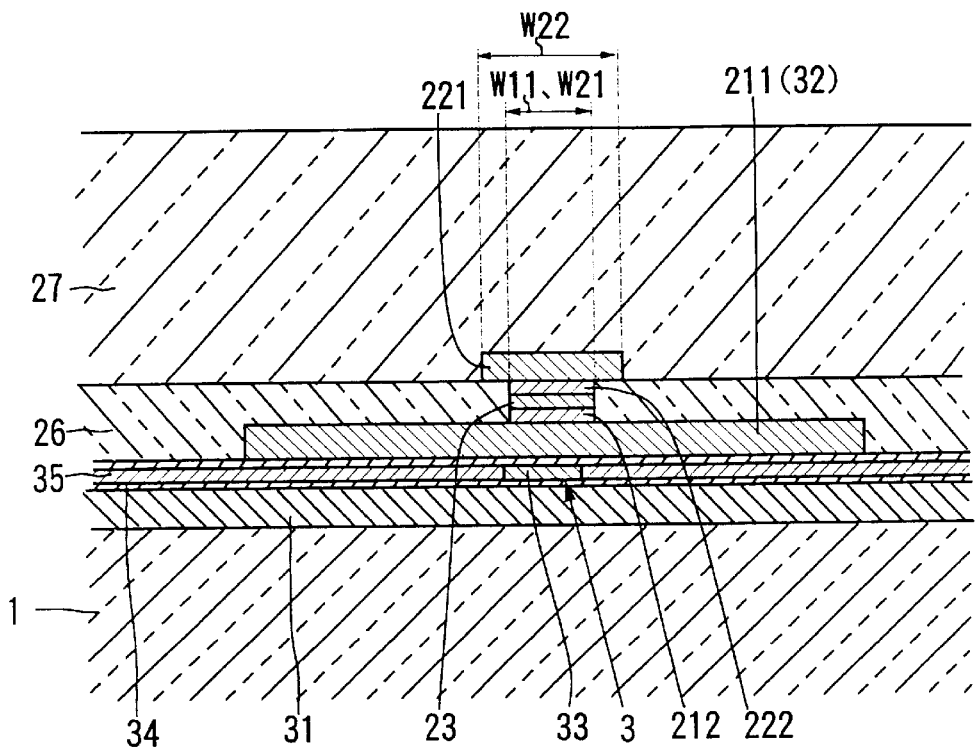
FIG. 2 is a cross section taken along line 2—2 in FIG. 1.
Figure 3:
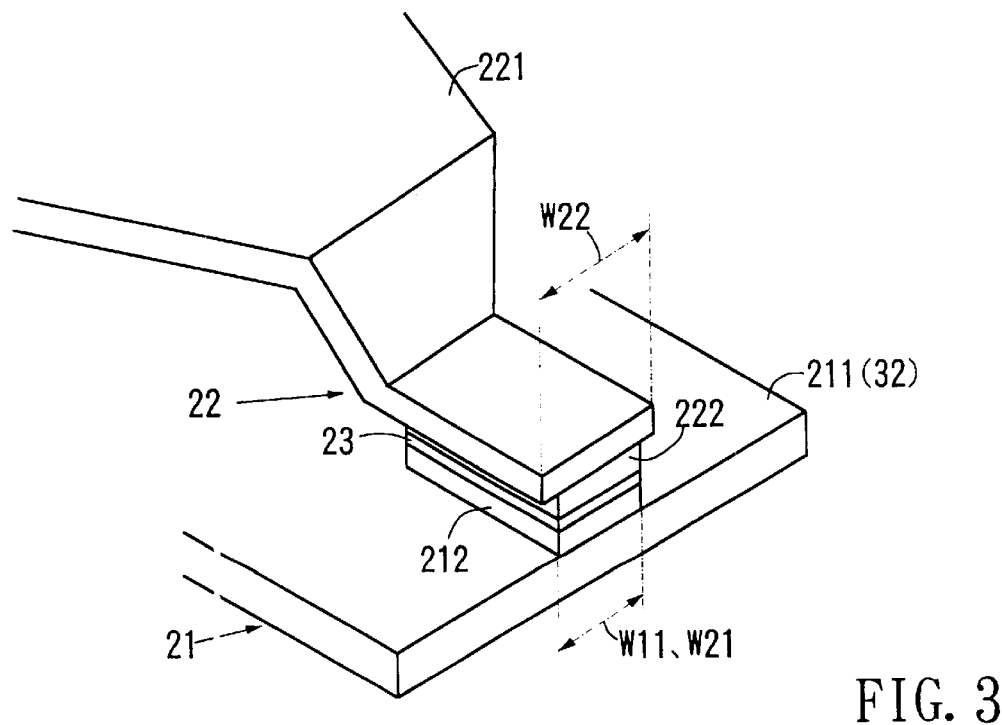
FIG. 3 is an enlarged perspective illustrating the pole tips in the thin film magnetic head shown in FIGS. 1 and 2.

Referring to FIGS. 1 to 3, the write element 2 and the MR read element 3 are laminated onto a body 1 which is employed as a slider, with the read/write portion located at an air bearing surface 10 of the body 1. The arrow (a) indicates the direction in which the air flows when the magnetic head is operated in combination with a rotating magnetic recording medium.

The write element 2 is constituted of an inductive thin film magnetic transducer and is laminated onto the MR read element 3. The write element 2 includes a first magnetic film 21, a second magnetic film 22, a gap film 23 and a coil film 24 supported by an insulating film 25 that is constituted of an organic resin. The first magnetic film 21 includes a first yoke 211 and a first pole tip 212, with the first pole tip 212 laminated projecting out over the first yoke 211. The gap film 23 may be constituted of a conductive, non-magnetic material such as Au, Cu, NiP or the like.

The second magnetic film 22 includes a second pole tip 222 and a second yoke 221. The second pole tip 222 is laminated onto the gap film 23 which, in turn, is laminated onto the first pole tip 212 with its track width W21 set essentially equal to the track width W11 of the first pole tip 212.

The areas around the first pole tip 212, the second pole tip 222 and the gap film 23 are filled with a non-magnetic insulating film. The surface of the non-magnetic insulating film 26 is flattened, and the surface thus flattened forms a flat surface that is essentially the same as the surface of the second pole tip 222. The non-magnetic insulating film 26 may be constituted of $Al_2O_3$, $SiO_2$ or the like. Reference number 27 indicates a protective film constituted of $Al_2O_3$, $SiO_2$ or the like that covers the entire surface.

The second yoke 221 is laminated onto the second pole tip 222 with its front end portion having a larger track width W22 than the track width W21 of the second pole tip 222 and its two ends in the direction of the track width laminated onto the surface of the non-magnetic insulating film 26. The insulating film 25 supporting the coil film 24 is formed on the surface of the non-magnetic insulating film 26.

The yokes 211 and 221 of the first magnetic film 21 and the second magnetic film 22 are linked to each other in a linking area 223 at the rear which is on the opposite side from the first pole tip 212 and the second pole tip 222, to complete a magnetic circuit. The coil film 24 is formed on the insulating film 25 to wind around the linking area 223 in a coil. The number of turns and the number of layers of the coil film 24 are arbitrary.

The MR read element 3 includes a first shield film 31, a second shield film 32, an MR element 33 and a lead conductive film 35. The first shield film 31 and the second shield film 32 are provided over a distance from each other, with the MR element 33 and the lead conductive film 35 provided between the first shield film 31 and the second shield film 32. The second shield film 32 constitutes the first yoke 211 of the write element 2. An inorganic insulating film 34 is present between the first shield film 31 and the second shield film 32, with the MR element 33 and the lead conductive film 35 provided inside the inorganic insulating film 34.

As described above, the second pole tip 222 at the write element 2 faces opposite the first pole tip 212 and is separated from the first pole tip 212 by the gap film 23, with its track width W21 set essentially equal to the track width W11 of the first pole tip 212. Thus, high density recording can be achieved by preventing a side fringing magnetic field from being generated and by improving the track density.

Since the second yoke 221 is laminated onto the second pole tip 222 with its front end portion having a larger track width W22 than the track width W21 of the second pole tip 222, the write capability does not become degraded even if the track width W21 at the second pole tip 222 is reduced.

In addition, since a structure is adopted in which the second yoke 221 is laminated onto the second pole tip 222 instead of forming the second yoke 221 at the same time as the second pole tip 222, the second yoke 221 can be formed after forming the second pole tip 222 in such a manner that it. will have a track width that is the same as the track width of the first pole tip 212 and the gap film 23 (W21 =W11). This structure achieves a number of advantages with respect to manufacturing processes, as detailed later.

The areas around the first pole tip 212, the second pole tip 222 and the gap film 23 are filled by the non-magnetic insulating film 26. The surface of the non-magnetic insulating film 26 is flattened, and the surface thus flattened forms a flat surface which is essentially the same as the surface of the second pole tip 222. One of the advantages achieved through this structure is that the second yoke 221 can be directly laminated onto the surface of the second pole tip 222 without having to provide an indented portion or the like at the surface of the non-magnetic insulating film 26. Because of this, even when the track width of the second pole tip 222 is reduced, the second yoke 221 can easily be laminated reliably to the second pole tip 222 with ease. Furthermore, since the front end portion of the second yoke 221 has a track width W22 larger than the track width W21 of the second pole tip 222, the write capability does not deteriorate, even if the track width W21 of the second pole tip 222 is reduced. In addition, since the two ends of the second yoke 221 in the direction of the track width are laminated onto the surface of the non-magnetic insulating film 26, a sufficient adhesion area and a sufficient degree of adhesion strength can be assured even if the track width W21 of the second pole tip 222 is reduced.

Another advantage is that through the flattening of the non-magnetic insulating film 26, a flat base for forming the coil film 24 is achieved. In other words, the coil film 24 and its supporting insulating film 25 can be formed on the flattened non-magnetic insulating film 26. As a result, since the coil film formation process can be executed on the flattened non-magnetic insulating film 26, disconnection, shorting and the like of the coil film 24, which tend to occur when forming the coil film 24 in an area with an uneven surface, can be avoided.

The write element 2 is laminated onto the MR read element 3. In this structure, the second shield film 32 also functions as the first yoke 211 of the write element 2. Since the first pole tip 212 is provided projecting out over the first yoke 211, the track width W11 of the first pole tip 212 can be reduced while maintaining the width of the second shield film 32 at a dimension that is required for the protection of the MR read element 3.

The inductive thin film magnetic transducer to constitute the write element 2 in the present invention may be constituted of one of various types of inductive thin film magnetic transducers that have been disclosed previously or that will be disclosed in the future. The MR read element 3 may be constituted of one of various types of elements that have been disclosed previously or that will be disclosed in the future, such as one that employs a magnetic anisot.ropic magnetoresistive film such as Permalloy, one that utilizes the giant magnetoresistance effect, typical examples of which include spin valve films and tunnel junction effect films, and the like. The write element 2 and the read element 3 are mounted on a slider. The slider may be of the type provided with one or more rails or the type that is not provided with rails.

Next, in reference to FIGS. 4 to 19, a method for manufacturing the thin film magnetic head according to the present invention is explained. While the actual manufacturing processes are executed on a wafer, one of the many magnetic head elements formed on the wafer is extracted and illustrated in the figures.

Figure 4:
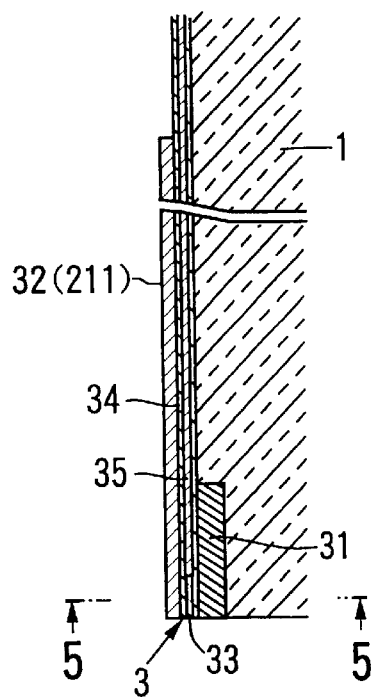
FIG. 4 is a cross section illustrating one of the steps implemented in the manufacturing method according to the present invention.
Figure 5:
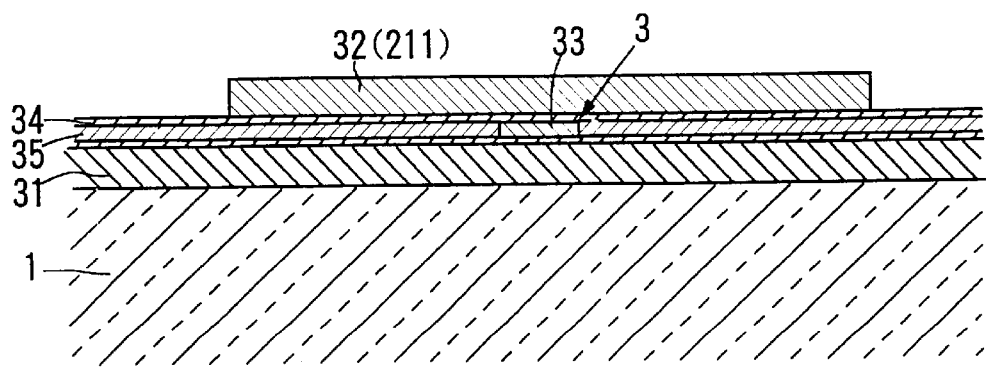
FIG. 5 is an enlarged cross section taken along line 5—5 in FIG. 4.

FIG. 4 is a cross section illustrating one step in the manufacturing method according to the present invention and FIG. 5 is an enlarged cross section along line 5—5 in FIG. 4. In the step illustrated in FIGS. 4 and 5, the MR read element 3 has already been formed on the body 1. The second shield film 32 of the MR read element 3 is formed on the surface of the inorganic insulating film 34.

Figure 6:
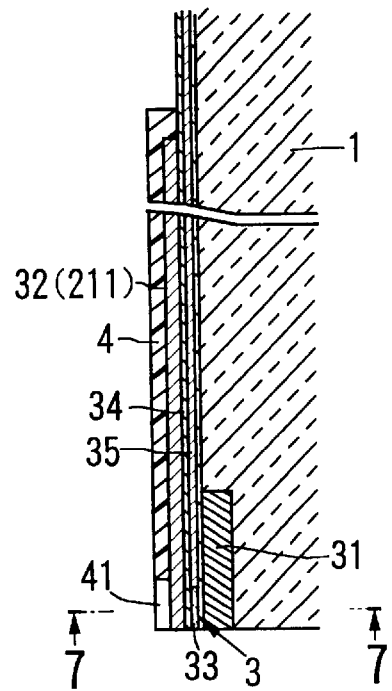
FIG. 6 is a cross section illustrating the step following the step illustrated in FIGS. 4 and 5.
Figure 7:
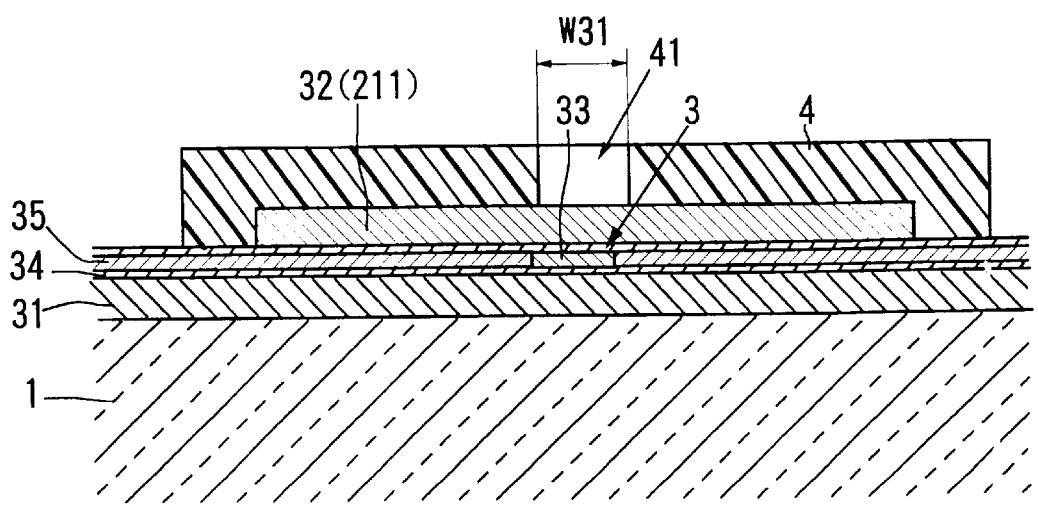
FIG. 7 is an enlarged cross section taken along line 7—7 in FIG. 6.

Next, as illustrated in FIGS. 6 and 7, the frame 4 is formed on the second shield film 32. The frame 4, which is formed through a photolithography process, is provided with an inner pattern 41 that defines the pattern at the pole tips. The width W31 of the inner pattern 41 defines the track widths W11 and W21 (see FIGS. 2 and 3) of the pole tips.

Figure 8:
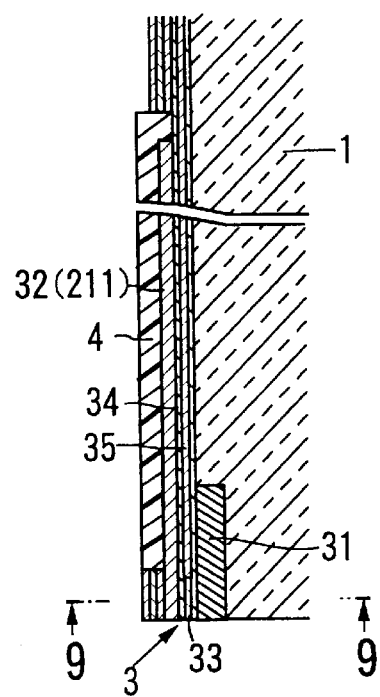
FIG. 8 is a cross section illustrating the step following the step illustrated in FIGS. 6 and 7.
Figure 9:
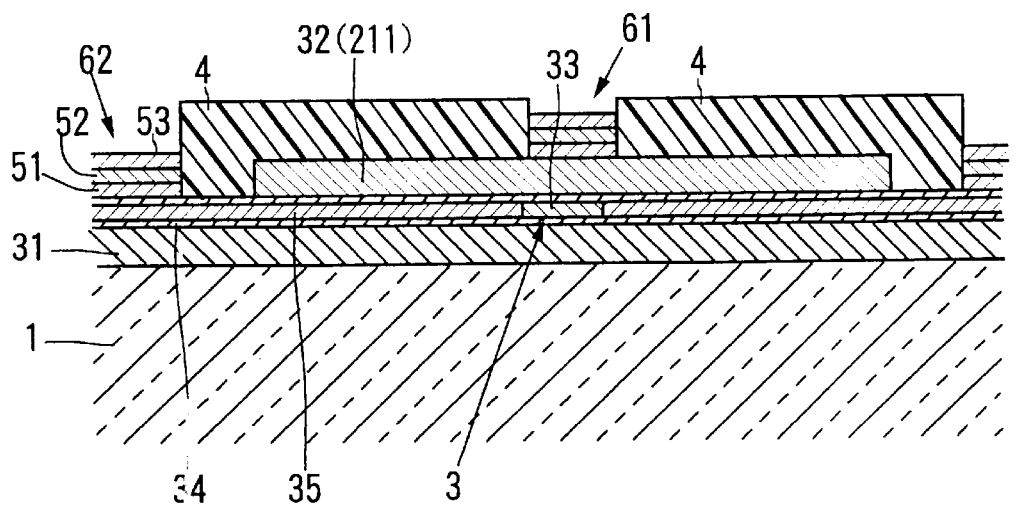
FIG. 9 is an enlarged cross section taken along line 9—9 in FIG. 8.

Then, as illustrated in FIGS. 8 and 9, laminated films 61 and 62 each constituted of a magnetic film 51, a non-magnetic film 52 and another magnetic film 53 are laminated onto the inner pattern 41 and the outer pattern defined by the frame 4. They may be formed through a frame plating method.

Figure 10:
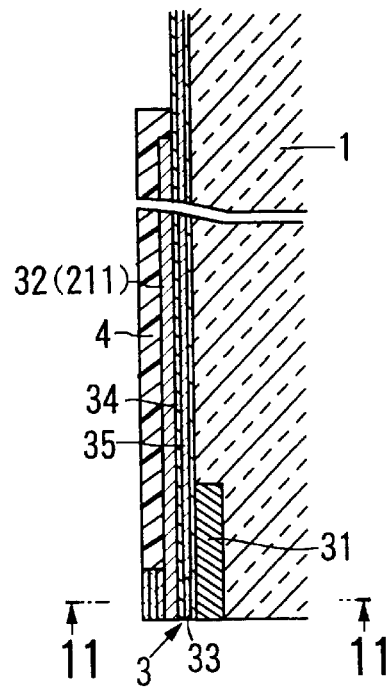
FIG. 10 is a cross section illustrating the step following the step illustrated in FIGS. 8 and 9.
Figure 11:
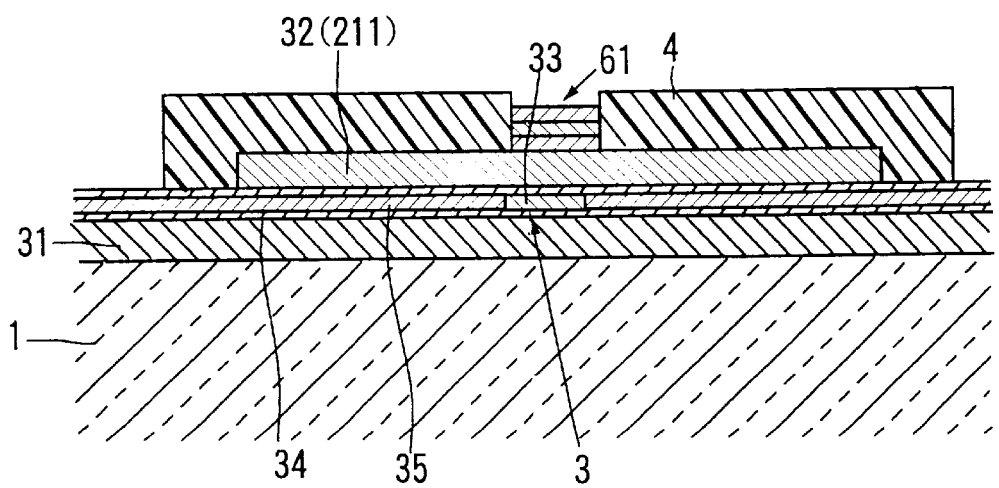
FIG. 11 is an enlarged cross section taken along line 11—11 in FIG. 10.

Next, as illustrated in FIGS. 10 and 11, the laminated film 62 laminated onto the outer pattern is removed while leaving intact the laminated film 61 laminated onto the inner pattern 41. In the laminated film 61 laminated onto the inner pattern 41, the magnetic film 51 laminated onto the second shield film 32 constitutes the first pole tip 212, the non-magnetic film 52 laminated onto the magnetic film 51 constitutes the gap film 23 and the other magnetic film 53 laminated onto the non-magnetic film 52 constitutes the second pole Lip 222. Since, through this manufacturing method, the frame 4 can be formed on a relatively flat surface during the laminating process, the track widths W11 and W21 of the first pole tip 212 and the second pole tip 222 can be set at a very small value with a high degree of accuracy determined through a photolithography process.

In addition, since the first pole tip 212, the gap film 23 and the second pole tip 222 are defined at the same time by the frame 4 that has been formed, they can be aligned easily and with a high degree of accuracy.

Figure 12:
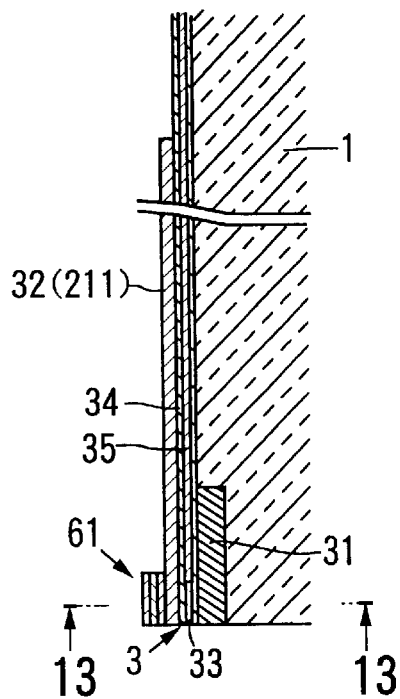
FIG. 12 is a cross section illustrating the step following the step illustrated in FIGS. 10 and 11.
Figure 13:
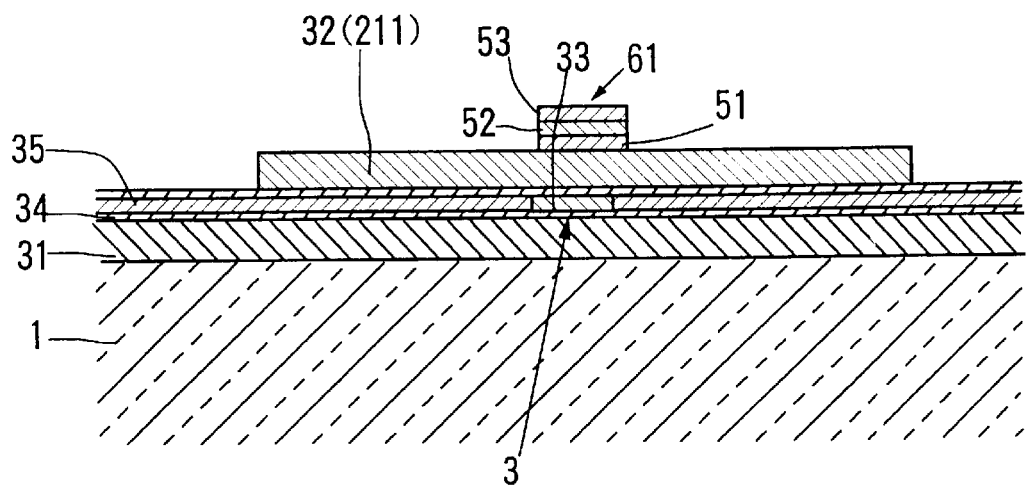
FIG. 13 is an enlarged cross section taken along line 13—13 in FIG. 12.

Next, as illustrated in FIGS. 12 and 13, the frame 4 is removed. The frame 4 may be removed by using an organic solvent or a resist remover solution.

Figure 14:
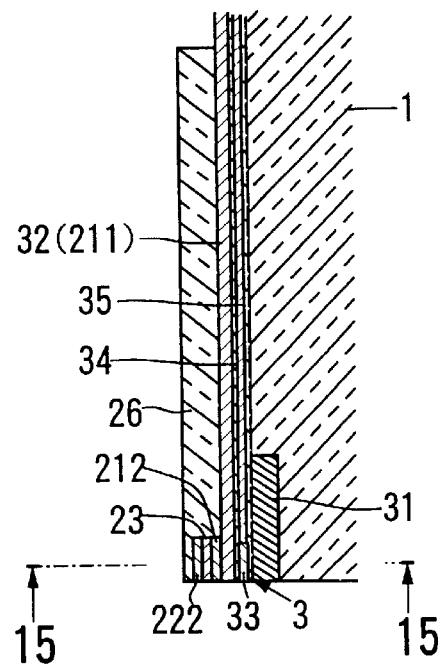
FIG. 14 is a cross section illustrating the step following the step illustrated in FIGS. 12 and 13.
Figure 15:
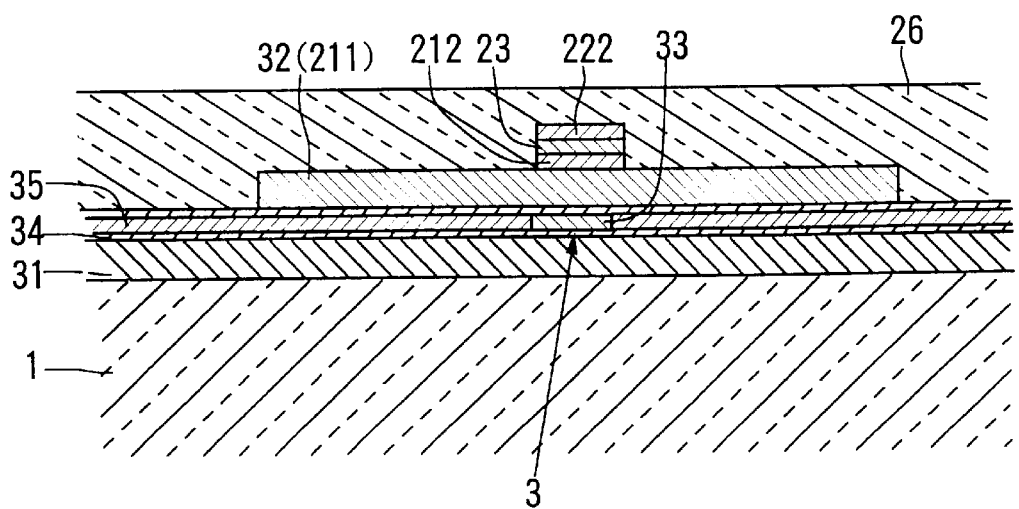
FIG. 15 is an enlarged cross section taken along line 15—15 in FIG. 14.

Then, as illustrated in FIGS. 14 and 15, the non-magnetic insulating film 26 that is to cover the first yoke 211 and the laminated film 61 is formed. The non-magnetic insulating film 26 may be formed by sputtering or the like.

Figure 16:
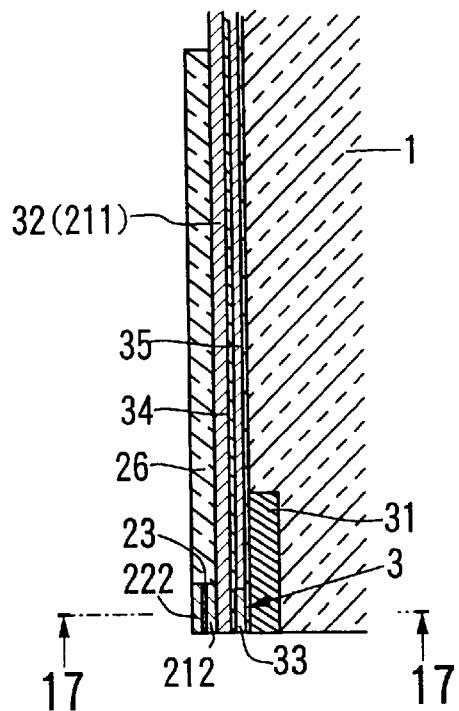
FIG. 16 is a cross section illustrating the step following the step illustrated in FIGS. 14 and 15.
Figure 17:
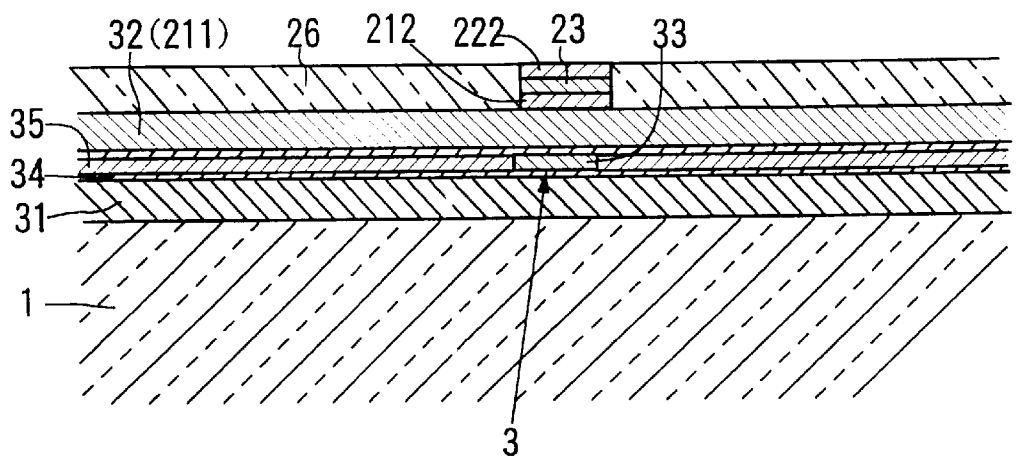
FIG. 17 is an enlarged cross section taken along line 17—17 in FIG. 16.

Next, as illustrated in FIGS. 16 and 17, the surface of the non-magnetic insulating film 26 is flattened and the surface of the second pole tip 222 is exposed. This flattening process may be achieved through polishing, ion beam milling or the like.

Figure 18:
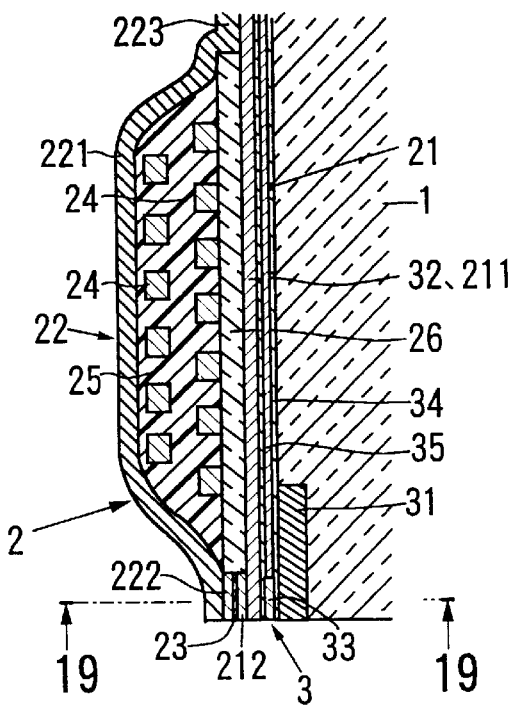
FIG. 18 is a cross section illustrating the step following the step illustrated in FIGS. 16 and 17.
Figure 19:
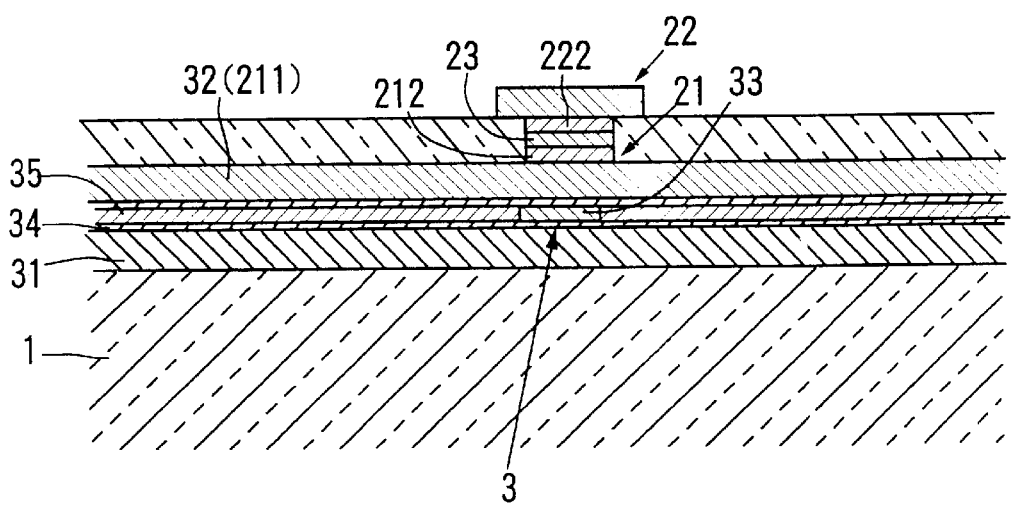
FIG. 19 is an enlarged cross section taken along line 19—19 in FIG. 18.

Then, as illustrated in FIGS. 18 and 19, after the coil film 24 and its supporting insulating film 25 are formed on the flattened non-magnetic insulating film 26, the second yoke 221 is formed. At this point, since the surface of the non-magnetic insulating film 26 has been flattened, and the surface thus flattened forms a flat surface that is essentially the same as the surface of the second pole tip 222, the second yoke 221 can be directly laminated onto the surface of the second pole tip 222 without having to provide an indented portion or the like at the surface of the non-magnetic insulating film 26. Thus, the second yoke 221 can be laminated onto the second pole tip 222 easily and with a high degree of reliability even when the track width of the second pole tip 222 is reduced.

Furthermore, the front end portion of the second yoke 221 is laminated with its front end portion having a larger track width W22 than the track width W21 of the second pole tip 222. This structure ensures that the write capability does not deteriorate even if the track width of the second pole tip 222 is reduced. In addition, since the two ends of the second yoke 221 in the direction of the track width are laminated onto the surface of the non-magnetic insulating film 26, a sufficient adhesion area and a sufficient degree of adhesion strength can be assured, even if the track width W21 of the second pole tip 222 is reduced. Moreover, since the pole tips (212, 23, 222) that determine the write characteristics will have been already formed by the time the second yoke 221 is formed, the execution of the process for forming the second yoke 221 does not affect the track width.

In addition, through the flattening of the non-magnetic insulating film 26, a flat base for forming the coil film 24 is achieved. In other words, the coil film 24 and its supporting insulating film 25 can be formed on the flattened non-magnetic insulating film 26. As a result, since the coil film 24 formation process can be executed on the flattened non-magnetic insulating film 26, disconnection, shorting and the like of the coil film 24 which tends to occur when forming the coil film 24 in an area with an uneven surface can be avoided.

What is claimed is:

1. A method of manufacturing a thin film magnetic head having a write element, comprising:

forming a frame on a first yoke of said write element, said frame having an inner portion and an outer portion;

laminating a laminated film on said first yoke in said inner portion of said frame, said laminated film comprising sequentially a first magnetic film, a non-magnetic film, and a second magnetic film corresponding respectively to a first pole tip, a gap film and a second pole tip of said write element;

removing said frame;

covering said first yoke and said laminated film with a non-magnetic insulating film;

flattening said non-magnetic insulating film so as to expose said second magnetic film corresponding to said second pole tip of said write element;

forming a coil film and a supporting insulating film on said flattened non-magnetic insulating film; and laminating a second yoke on said exposed second magnetic film and on a portion of said non-magnetic insulating film.

2. The method of claim 1, wherein forming said frame is performed so that two ends of said laminated film in a direction of a track width of the laminated film are aligned at a substantially same position at least at a surface facing opposite to a medium to be written on by said write element.

3. The method of claim 1, wherein forming said frame is performed so that rear ends of said laminated film, viewed from a surface facing a medium to be written on by said write element, form a flat surface.

4. The method of claim 3, further comprising linking said first yoke to said second yoke at a rear of said write element, whereby said second yoke extends further rearward than said rear ends.

5. The method of claim 1, wherein said non-magnetic film corresponding to said gap film comprises a conductive, non-magnetic material.

6. The method of claim 5, wherein said conductive, non-magnetic material comprises at least one of Au, Cu and NiP.

7. The method of claim 1, wherein said non-magnetic insulating film comprises at least one of $Al_2O_3$ and $SiO_2$.

8. The method of claim 1, further comprising forming a read element on said magnetic head.

9. The method of claim 8, wherein forming said read element comprises forming a magnetically sensitive element.

10. The method of claim 9, wherein forming said magnetically sensitive element comprises forming a magnetoresistive film.

11. The method of claim 9, further comprising:

forming a first shield and a second shield sandwiching said magnetically sensitive element.

12. The method of claim 11, wherein forming one of said first and second shields is performed by forming one of said first and second yokes of the write element.

13. The method of claim 8, wherein forming said read element is performed before forming said write element.

14. The method of claim 8, wherein forming said read element is performed after forming said write element.

15. The method of claim 1, wherein laminating said laminated film on said first yoke in the inner portion of the frame comprises:

laminating a laminated film in said inner portion and said outer portion; and removing said laminated film laminated in said outer portion without removing said laminated film in said inner portion.

16. The method of claim 1, wherein forming said frame comprises forming said frame through a photolithography process.

17. The method of claim 1, wherein removing said frame comprises removing said frame with one of an organic solvent and a resist solvent.

18. The method of claim 1, wherein covering said first yoke and said laminated film with said non-magnetic insulating film comprises sputtering said non-magnetic insulating film.

19. The method of claim 1, wherein flattening said non-magnetic insulating film comprises one of polishing and ion beam milling said non-magnetic insulating film.

* * * * *